(12) United States Patent
Song et al.

(10) Patent No.: US 7,682,438 B2
(45) Date of Patent: Mar. 23, 2010

(54) PAPER SUBSTRATE HAVING ENHANCED PRINT DENSITY

(75) Inventors: Jay C Song, Highland Mills, NY (US); Sen Yang, Mason, OH (US); Yan C Huang, Williamsburg, OH (US); Kapil M Singh, Loveland, OH (US); Michael Koenig, Loveland, OH (US); David B Shelmidine, Ticonderoga, NY (US)

(73) Assignee: International Paper Company, Memphis, TN (US)

( * ) Notice: Subject to any disclaimer, the term of this patent is extended or adjusted under 35 U.S.C. 154(b) by 603 days.

(21) Appl. No.: 11/591,087

(22) Filed: Nov. 1, 2006

(65) Prior Publication Data
US 2007/0125267 A1    Jun. 7, 2007

Related U.S. Application Data

(60) Provisional application No. 60/732,828, filed on Nov. 1, 2005.

(51) Int. Cl.
  *C09J 103/00* (2006.01)
  *D21H 17/03* (2006.01)
  *D21H 21/30* (2006.01)

(52) U.S. Cl. .................. 106/214.1; 106/214.2; 162/158; 162/162; 162/168.2; 162/181.1; 162/175; 162/184

(58) Field of Classification Search ............. 106/214.1, 106/214.2; 162/158, 162, 168.2, 181.1, 175, 162/184

See application file for complete search history.

(56) References Cited

U.S. PATENT DOCUMENTS

| | | | |
|---|---|---|---|
| 2,322,888 | A | 6/1943 | Schwartz et al. |
| 4,022,965 | A | 5/1977 | Goheen et al. |
| 4,040,900 | A | 8/1977 | Mazzarella et al. |
| 4,075,136 | A | 2/1978 | Schaper |
| 4,166,894 | A | 9/1979 | Schaper |
| 4,174,417 | A | 11/1979 | Rydell |
| 4,279,794 | A | 7/1981 | Dumas |
| 4,425,405 | A | 1/1984 | Murakami et al. |
| 4,431,481 | A | 2/1984 | Drach et al. |
| 4,446,174 | A | 5/1984 | Maekawa et al. |
| 4,478,910 | A | 10/1984 | Oshima et al. |
| 4,481,244 | A | 11/1984 | Haruta et al. |
| 4,496,427 | A | 1/1985 | Davison |

(Continued)

FOREIGN PATENT DOCUMENTS

DE          19534327          2/1996

(Continued)

*Primary Examiner*—Steven P Griffin
*Assistant Examiner*—Dennis Cordray
(74) *Attorney, Agent, or Firm*—Thomas W. Barnes, III; John K. Pike

(57) ABSTRACT

The present invention relates to a sizing composition that, when applied to paper substrate, creates a substrate, preferably suitable for inkjet printing, having increased print density, print sharpness, low HST, and/or image dry time, the substrate preferably having high brightness and reduced color-to-color bleed as well. In addition, the present invention relates to a method of reducing the HST of a paper substrate by applying the sizing composition to at least one surface thereof. Further, the application relates to methods of making and using the sizing composition, as well as methods of making and using the paper containing the sizing composition.

20 Claims, 1 Drawing Sheet

U.S. PATENT DOCUMENTS

| | | | |
|---|---|---|---|
| 4,496,629 A | 1/1985 | Haruta et al. | |
| 4,503,118 A | 3/1985 | Murakami et al. | |
| 4,517,244 A | 5/1985 | Kobayashi et al. | |
| 4,554,181 A | 11/1985 | Cousin et al. | |
| 4,576,867 A | 3/1986 | Miyamoto | |
| 4,636,409 A | 1/1987 | Arai et al. | |
| 4,717,502 A * | 1/1988 | Schmid | 252/301.23 |
| 4,740,420 A | 4/1988 | Akutsu et al. | |
| 4,792,487 A | 12/1988 | Schubring et al. | |
| 4,830,911 A | 5/1989 | Kojima et al. | |
| 4,877,680 A | 10/1989 | Sakaki et al. | |
| 4,908,240 A | 3/1990 | Auhorn et al. | |
| 4,986,882 A | 1/1991 | Mackey et al. | |
| 5,013,603 A | 5/1991 | Ogawa et al. | |
| 5,049,235 A | 9/1991 | Barcus et al. | |
| 5,160,789 A | 11/1992 | Barcus et al. | |
| 5,163,973 A | 11/1992 | Ellis | |
| 5,190,805 A | 3/1993 | Atherton et al. | |
| 5,209,953 A | 5/1993 | Grupe et al. | |
| 5,266,250 A | 11/1993 | Kroyer | |
| 5,270,103 A | 12/1993 | Oliver et al. | |
| 5,314,747 A | 5/1994 | Malhotra et al. | |
| 5,320,902 A | 6/1994 | Malhorta et al. | |
| 5,360,420 A | 11/1994 | Cook et al. | |
| 5,397,619 A | 3/1995 | Kuroyama et al. | |
| 5,405,678 A | 4/1995 | Bilodeau | |
| 5,429,860 A | 7/1995 | Held et al. | |
| 5,443,899 A | 8/1995 | Barcus et al. | |
| 5,457,486 A | 10/1995 | Malhotra et al. | |
| 5,474,843 A | 12/1995 | Lambert et al. | |
| 5,531,728 A | 7/1996 | Lash | |
| 5,537,137 A | 7/1996 | Held et al. | |
| 5,657,064 A | 8/1997 | Malhotra | |
| 5,662,773 A | 9/1997 | Frederick et al. | |
| 5,667,637 A | 9/1997 | Jewell et al. | |
| 5,695,609 A | 12/1997 | Petander et al. | |
| 5,698,074 A | 12/1997 | Barcus et al. | |
| 5,698,688 A | 12/1997 | Smith et al. | |
| 5,729,266 A | 3/1998 | Malhotra et al. | |
| 5,731,080 A | 3/1998 | Cousin et al. | |
| 5,760,809 A | 6/1998 | Malhotra et al. | |
| 6,030,443 A | 2/2000 | Bock et al. | |
| 6,132,855 A * | 10/2000 | Becher et al. | 428/219 |
| 6,146,494 A | 11/2000 | Seger et al. | |
| 6,241,786 B1 * | 6/2001 | Zarges et al. | 8/527 |
| 6,310,132 B1 * | 10/2001 | Sackmann et al. | 524/457 |
| 6,361,651 B1 | 3/2002 | Sun | |
| 6,471,824 B1 | 10/2002 | Jewell | |
| 6,506,282 B2 | 1/2003 | Hu et al. | |
| 6,579,414 B2 | 6/2003 | Jewell | |
| 6,579,415 B2 | 6/2003 | Jewell | |
| 6,582,557 B2 | 6/2003 | Jewell | |
| 6,592,712 B2 | 7/2003 | Koukoulas et al. | |
| 6,592,717 B2 | 7/2003 | Jewell | |
| 6,613,104 B2 * | 9/2003 | Zarges et al. | 8/648 |
| 6,764,726 B1 | 7/2004 | Yang et al. | |
| 6,869,658 B2 * | 3/2005 | Becker | 428/67 |
| 2003/0089888 A1 * | 5/2003 | Bacher et al. | 252/301.21 |
| 2003/0236326 A1 * | 12/2003 | Drenker et al. | 524/100 |
| 2004/0123966 A1 | 7/2004 | Altman et al. | |
| 2004/0237846 A1 * | 12/2004 | Farrar | 106/499 |
| 2006/0252872 A1 * | 11/2006 | Jonckheree | 524/493 |
| 2007/0062653 A1 * | 3/2007 | Duggirala et al. | 162/9 |

FOREIGN PATENT DOCUMENTS

| | | |
|---|---|---|
| EP | 0187666 | 7/1986 |
| EP | 0629741 | 12/1994 |
| EP | 0666368 | 8/1995 |
| EP | 1481811 A1 * | 12/2004 |
| EP | 1500746 | 1/2005 |
| GB | 551950 | 3/1943 |
| GB | 786543 | 11/1957 |
| GB | 903416 | 8/1962 |
| GB | 1373788 | 11/1974 |
| GB | 1533434 | 11/1978 |
| GB | 2205967 | 12/1988 |
| WO | WO0047628 | 8/2000 |

* cited by examiner

PAPER SUBSTRATE HAVING ENHANCED PRINT DENSITY

The present application claims the benefit of priority under 35 USC §119(e) to U.S. Provisional Patent Application 60/732,828, filed Nov. 1, 2005, which is hereby incorporated, in its entirety, herein by reference.

FIELD OF THE INVENTION

The present invention relates to a sizing composition that, when applied to paper substrate, creates a substrate, preferably suitable for inkjet printing, having increased print density, print sharpness, low HST, and/or image dry time, the substrate preferably having high brightness and reduced color-to-color bleed as well. In addition, the present invention relates to a method of reducing the HST of a paper substrate by applying the sizing composition to at least one surface thereof. Further, the application relates to methods of making and using the sizing composition, as well as methods of making and using the paper containing the sizing composition.

BACKGROUND OF THE INVENTION

Ink jet recording systems using aqueous inks are now well known. These systems usually generate almost no noise and can easily perform multicolor recordings for business, home and commercial printing applications. Recording sheets for ink jet recordings are known. See for example U.S. Pat. Nos. 5,270,103; 5,657,064; 5,760,809; 5,729,266; 4,792,487; 5,405,678; 4,636,409; 4,481,244; 4,496,629; 4,517,244; 5,190,805; 5,320,902; 4,425,405; 4,503,118; 5,163,973; 4,425,405; 5,013,603; 5,397,619; 4,478,910; 5,429,860; 5,457,486; 5,537,137; 5,314,747; 5,474,843; 4,908,240; 5,320,902; 4,740,420; 4,576,867; 4,446,174; 4,830,911; 4,554,181; 6,764,726 and 4,877,680, which are hereby incorporated, in their entirety, herein by reference.

However, conventional paper substrates, such as those above remain poor in balancing good print density, HST, color-to-color bleed, print sharpness, and/or image dry time. Accordingly, there is a need to provide such high-performance functionality to paper substrates useful in inkjet printing, especially those substrates preferably having high brightness.

DETAILED DESCRIPTION OF THE INVENTION

Figure 1:
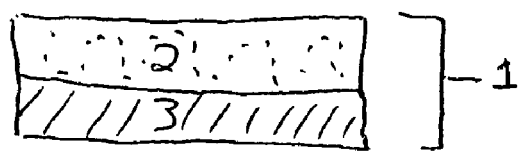
FIG. 1: A first schematic cross section of just one exemplified embodiment of the paper substrate that is included in the paper substrate of the present invention.

The present inventors have discovered a sizing composition that, when applied to paper or paperboard substrates, improves the substrate's print density, color-to-color bleed, print sharpness, and/or image dry time. Further, the paper substrate preferably has a high brightness.

The sizing composition may contain a pigment. Examples of pigments are clay, calcium carbonate, calcium sulfate hemihydrate, and calcium sulfate dehydrate, calcium carbonate, preferably precipitated calcium carbonate, in any form including ground calcium carbonate and silica-treated calcium carbonate. When the pigment is a calcium carbonate, it may be in any form. Examples include ground calcium carbonate and/or precipitated calcium carbonate. Commercially available products that are preferred are those offered as Jetcoat 30 from Specialty Minerals Inc., Jetcoat MD1093 from Specialty Minerals Inc., XC3310-1 from Omya Inc, and OmyaJet B5260, C4440 and 6606 from Omya Inc.

The pigment may have any surface area. Those pigments having a high surface area are included, including those having a surface area of greater than 20 square meters/gram, preferably greater than 30 square meters/gram, more preferably greater than 50 square meters/gram, most preferably greater than 100 square meters/gram. This range includes greater than or equal to 1, 5, 10, 15, 20, 25, 30, 35, 40, 45, 50, 55, 60, 65, 70, 75, 80, 85, 90, 100 square meters/gram, including any and all ranges and subranges contained therein.

The sizing composition may contain a pigment at any amount. The composition may include from 0 to 99 wt % based upon the total weight of the solids in the composition, preferably at least 15 wt %, more preferably at least 30 wt %, most preferably at least 45 wt % pigment based upon the total weight of the solids in the composition. This range may include 0, 1, 5, 10, 15, 20, 25, 30, 35, 40, 45, 50, 55, 60, 65, 70, 75, 80, 85, 90, 100 wt % of pigment based upon the total weight of the solids in the composition, including any and all ranges and subranges contained therein. The most preferred amount being about 52 wt % pigment based upon the total weight of the solids in the composition.

The sizing composition may contain a binder. Examples of binders include, but are not limited to, polyvinyl alcohol, Amres (a Kymene type), Bayer Parez, polychloride emulsion, modified starch such as hydroxyethyl starch, starch or derivatives thereof including cationic and oxidized forms and from corn and/or potato for example, polyacrylamide, modified polyacrylamide, polyol, polyol carbonyl adduct, ethanedial/polyol condensate, polyamide, epichlorohydrin, glyoxal, glyoxal urea, ethanedial, aliphatic polyisocyanate, isocyanate, 1,6 hexamethylene diisocyanate, diisocyanate, polyisocyanate, polyester, polyester resin, polyacrylate, polyacrylate resin, acrylate, and methacrylate. While any combination of binders may be used, one embodiment includes a sizing composition containing starch or modifications thereof combined with polyvinyl alcohol as multi-component binder.

When there is a multicomponent binder system, one embodiment relates to a system including at least starch and deriviates thereof with polyvinyl alcohol. In this embodiment, the ratio of starch/PVOH solids based on the total weight of the solids in the sizing composition may be any ratio so long as both are present in the composition. The sizing composition may contain a ratio of starch/PVOH wt % solids based on the total weight of the solids in the composition of from 99/1 to 1/99, preferably from 50/1 to 1/5, more preferably at most 10/1 to 1:2, most preferably at most 8/1 to 1/1. This range includes 99/1, 50/1, 25/1, 15/1, 10/1, 9/1, 8/1, 7/1, 6/1, 5/1, 4/1, 3/1, 2/1, 1/1, 2/3, 1/2, 1/10, 1/25, 1/50, 1/99, including any and all ranges and subranges therein. The most preferred starch/PVOH ratio being 6/1.

When polyvinyl alcohol is utilized in the sizing solution and/or in the paper, polyvinyl alcohol (PVOH) is produced by hydrolyzing polyvinyl acetate (PVA). The acetate groups are replaced with alcohol groups and the higher the hydrolysis indicates that more acetate groups have been replaced. Lower hydrolysis/molecular weight PVOH are less viscous and more water soluble. The PVOH may have a %hydrolysis ranging from 100% to 75%. The % hydrolysis may be 75, 76, 78, 80, 82, 84, 85, 86, 88, 90, 92, 94, 95, 96, 98, and 100% hdrolysis, %, including any and all ranges and subranges therein. Preferably, the % hydrolysis of the PVOH is greater than 90%.

The sizing composition may contain a binder at any amount. The sizing composition may contain at least one binder from 0 to 99 wt %, preferably at least 10 wt %, more preferably at least 20 wt %, most preferably at least 30 wt % based on the total weight of the solids in the composition. This range may include 0, 1, 5, 10, 15, 20, 25, 30, 35, 40, 45, 50, 55, 60, 65, 70, 75, 80, 85, 90, 100 wt % based on the total weight of the solids in the composition, including any and all ranges and subranges contained therein. The most preferred being about 37 wt % binder based on the total weight of the solids in the composition.

In one embodiment, when the sizing composition contains a binder and a pigment, the weight ratio of the binder/pigment may be any ratio. The binder pigment weight ratio may be from 99/1 to 1/99, preferably from 50/1 to 1/10, more preferably from 25/1 to 1/5, most preferably from 10/1 to 1/3. This range includes 99/1, 50/1, 25/1, 10/1, 5/1, 2/1, 1/1, 1/2, 2/3, 1/3, 1/4, 1/5, 10/1, 25/1, 50/1, and 99/1, including any and all ranges and subranges therein. The most preferred binder/pigment weight ratio is 7/10.

The sizing composition may contain at least one nitrogen containing organic species. Exemplified nitrogen containing organic species are compounds, oligomers and polymers are those containing one or more quaternary ammonium functional groups. Such functional groups may vary widely and include substituted and unsubstituted amines, imines, amides, urethanes, quaternary ammonium groups, dicyandiamides and the like. Illustrative of such materials are polyamines, polyethyleneimines, polymers and copolymers of diallyldimethyl ammonium chloride (DADMAC), copolymers of vinyl pyrrolidone (VP) with quatemized diethylaminoethylmethacrylate (DEAMEMA), polyamides, cationic polyurethane latex, cationic polyvinyl alcohol, polyalkylamines dicyandiamid copolymers, amine glycigyl addition polymers, poly[oxyethylene (dimethyliminio) ethylene (dimethyliminio) ethylene] dichlorides. Examples of nitrogen containing species include those mentioned in U.S. Pat. No. 6,764,726, which is hereby incorporated, in its entirety, herein by reference. The most preferred nitrogen containing species are polymers and copolymers of diallyldimethyl ammonium chloride (DADMAC).

The sizing composition may contain at least one nitrogen containing organic species at any amount. The sizing composition may contain the nitrogen containing species at an amount ranging from 0 to 99 wt %, preferably from 0.5 to 50 wt %, more preferably from 1 to 20 wt %, most preferably from 2 to 10 wt % based on the total weight of the solids in the composition. This range may include 0, 0.5, 1, 2, 3, 4, 5, 6, 7, 8, 9, 10, 15, 20, 25, 30, 35, 40, 45, 50, 55, 60, 65, 70, 75, 80, 85, 90, 100 wt % based on the total weight of the solids in the composition, including any and all ranges and subranges contained therein. In a preferred embodiment, the composition contains about 8 wt % of the nitrogen containing species based on the total weight of the solids in the composition.

The sizing composition may contain at least one inorganic salt. Suitable inorganic salts may be monovalent and/or divalent and/or trivalent and may contain any level of hydration complexes thereof. Exemplified inorganic salts are those from Groups 1, 2 and 13 from the Periodic Table of Elements and hydrated complexes thereof, including monohydrates, dihydrates, trihydrates, tetrahydrates, etc. The cationic metal may be sodium, calcium, magnesium, and aluminum preferably. The anionic counterion to the cationic metal of the inorganic salt may be any halogen such as chloride, boride, fluoride, etc and/or hydroxyl group(s). The most preferred inorganic salt being sodium chloride.

The sizing composition may contain at least one inorganic salt at any amount. The sizing composition may contain from 0 to 99 wt %, preferably from 0.25 to 25 wt %, more preferably from 0.5 to 5, most preferably from 1 to 3 wt % of the inorganic salt based on the total weight of the solids in the composition. This range may include 0, 0.25, 0.5, 1, 2, 3, 4, 5, 10, 15, 20, 25, 30, 35, 40, 45, 50, 55, 60, 65, 70, 75, 80, 85, 90, 100 wt % based on the total weight of the solids in the composition, including any and all ranges and subranges contained therein. In a preferred embodiment, the sizing composition contains about 2.5 wt % of the inorganic salt based on the total weight of the solids in the composition.

The sizing composition may contain at least one optical brightening agent (OBA). Suitable OBAs may be those mentioned in U.S. Ser. No. 60/654,712 filed Feb. 19, 2005, and U.S. Pat. No. 6,890,454, which are hereby incorporated, in their entirety, herein by reference. The OBAs may be commercially available from Clariant. Further, the OBA may be either cationic and/or anionic. Example OBA is that commercially available Leucophore BCW and Leucophore FTS from Clariant. In one embodiment, the OBA contained in the sizing composition is cationic.

The sizing composition may contain any amount of at least one anionic OBA. The sizing composition may contain anionic OBA at an amount from 0 to 99 wt %, preferably from 5 to 75 wt %, more preferably from 10 to 50 wt %, most preferably from 20 to 40 wt % based on the total weight of the solids in the composition. This range may include 0, 1, 5, 10, 15, 20, 25, 30, 35, 40, 45, 50, 55, 60, 65, 70, 75, 80, 85, 90, 99 wt % anionic OBA based on the total weight of the solids in the composition, including any and all ranges and subranges contained therein. In a preferred embodiment, the sizing composition contains about 35 wt % of anionic OBA based on the total weight of the solids in the composition.

The sizing composition may contain any amount of at least one cationic OBA. The sizing composition may contain cationic OBA at an amount from 0 to 99 wt %, preferably from 0.5 to 25 wt %, more preferably from 1 to 20 wt %, most preferably from 5 to 15 wt % based on the total weight of the solids in the composition. This range may include 0, 1, 5, 10, 15, 20, 25, 30, 35, 40, 45, 50, 55, 60, 65, 70, 75, 80, 85, 90, 99 wt % anionic OBA based on the total weight of the solids in the composition, including any and all ranges and subranges contained therein. In a preferred embodiment, the sizing composition contains about 8 wt % of cationic OBA based on the total weight of the solids in the composition.

The present invention also relates to a paper substrate containing any of the sizing compositions described above.

The paper substrate contains a web of cellulose fibers. The source of the fibers may be from any fibrous plant. The paper substrate of the present invention may contain recycled fibers and/or virgin fibers. Recycled fibers differ from virgin fibers in that the fibers have gone through the drying process at least once.

The paper substrate of the present invention may contain from 1 to 99 wt %, preferably from 5 to 95 wt %, most preferably from 60 to 80 wt % of cellulose fibers based upon the total weight of the substrate, including 1, 5, 10, 15, 20, 25, 30, 35, 40, 45, 50, 55, 60, 65, 70, 75, 80, 85, 90, 95 and 99 wt %, and including any and all ranges and subranges therein.

While the fiber source may be any, the preferable sources of the cellulose fibers are from softwood and/or hardwood. The paper substrate of the present invention may contain from 1 to 100 wt %, preferably from 5 to 95 wt %, cellulose fibers originating from softwood species based upon the total amount of cellulose fibers in the paper substrate. This range includes 1, 2, 5, 10, 15, 20, 25, 30, 35, 40, 45, 50, 55, 60, 65, 70, 75, 80, 85, 90, 95, and 100 wt %, including any and all ranges and subranges therein, based upon the total amount of cellulose fibers in the paper substrate.

The paper substrate of the present invention may contain from 1 to 100 wt %, preferably from 5 to 95 wt %, cellulose fibers originating from hardwood species based upon the total amount of cellulose fibers in the paper substrate. This range includes 1, 2, 5, 10, 15, 20, 25, 30, 35, 40, 45, 50, 55, 60, 65, 70, 75, 80, 85, 90, 95, and 100 wt %, including any and all ranges and subranges therein, based upon the total amount of cellulose fibers in the paper substrate.

When the paper substrate contains both hardwood and softwood fibers, it is preferable that the hardwood/softwood ratio be from 0.001 to 1000. This range may include 0.001, 0.002, 0.005, 0.01, 0.02, 0.05, 0.1, 0.2, 0.5, 1, 2, 5, 10, 15, 20, 25, 30, 35, 40, 45, 50, 55, 60, 65, 70, 75, 80, 85, 90, 95, 100, 200, 300, 400, 500, 600, 700, 800, 900, and 1000 including any and all ranges and subranges therein and well as any ranges and subranges therein the inverse of such ratios.

Further, the softwood and/or hardwood fibers contained by the paper substrate of the present invention may be modified by physical and/or chemical means. Examples of physical means include, but is not limited to, electromagnetic and mechanical means. Means for electrical modification include, but are not limited to, means involving contacting the fibers with an electromagnetic energy source such as light and/or electrical current. Means for mechanical modification include, but are not limited to, means involving contacting an inanimate object with the fibers. Examples of such inanimate objects include those with sharp and/or dull edges. Such means also involve, for example, cutting, kneading, pounding, impaling, etc means.

Examples of chemical means include, but is not limited to, conventional chemical fiber modification means including crosslinking and precipitation of complexes thereon. Examples of such modification of fibers may be, but is not limited to, those found in the following U.S. Pat. Nos. 6,592,717, 6,592,712, 6,582,557, 6,579,415, 6,579,414, 6,506,282, 6,471,824, 6,361,651, 6,146,494, H1,704, 5,731,080, 5,698,688, 5,698,074, 5,667,637, 5,662,773, 5,531,728, 5,443,899, 5,360,420, 5,266,250, 5,209,953, 5,160,789, 5,049,235, 4,986,882, 4,496,427, 4,431,481, 4,174,417, 4,166,894, 4,075,136, and 4,022,965, which are hereby incorporated, in their entirety, herein by reference. Further modification of fibers is found in U.S. Patent Applications having application Ser. No. 60/654,712 filed Feb. 19, 2005; 11/358,543 filed Feb. 21, 2006; Ser. No. 11/445,809 filed Jun. 2, 2006; and Ser. No. 11/446,421 filed Jun. 2, 2006, which may include the addition of optical brighteners (i.e. OBAs) as discussed therein, which are hereby incorporated, in their entirety, herein by reference.

One example of a recycled fiber is a "fine". Sources of "fines" may be found in SaveAll fibers, recirculated streams, reject streams, waste fiber streams. The amount of "fines" present in the paper substrate can be modified by tailoring the rate at which such streams are added to the paper making process.

The paper substrate preferably contains a combination of hardwood fibers, softwood fibers and "fines" fibers. "Fines" fibers are, as discussed above, recirculated and are any length. Fines may typically be not more that 100 μm in length on average, preferably not more than 90 μm, more preferably not more than 80 μm in length, and most preferably not more than 75 μm in length. The length of the fines are preferably not more than 5, 10, 15, 20, 25, 30, 35, 40, 45, 50, 55, 60, 65, 70, 75, 80, 85, 90, 95, and 100 μm in length, including any and all ranges and subranges therein.

The paper substrate may contain fines at any amount. The paper substrate may contain from 0.01 to 100 wt % fines, preferably from 0.01 to 50 wt %, most preferably from 0.01 to 15 wt % based upon the total weight of the fibers contained by the paper substrate. The paper substrate contains not more than 0.01, 0.05, 0.1, 0.2, 0.5, 1, 2, 3, 4, 5, 6, 7, 8, 9, 10, 12, 15, 20, 25, 30, 35, 40, 45, 50, 55, 60, 65, 70, 75, 80, 85, 90, 95 and 100 wt % fines based upon the total weight of the fibers contained by the paper substrate, including any and all ranges and subranges therein.

The paper substrate may also contain an internal sizing and/or external sizing composition. The internal sizing composition may be applied to the fibers during papermaking at the wet end, while the external sizing composition may be applied to the fibers via a size press and/or coater. The above mentioned sizing compositions of the present invention may be the internal and/or external sizing composition contained by the paper substrate of the present invention.

Figure 2:
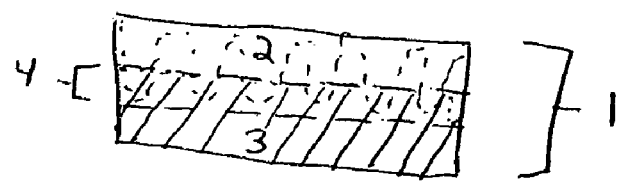
FIG. 2: A second schematic cross section of just one exemplified embodiment of the paper substrate that is included in the paper substrate of the present invention.
Figure 3:
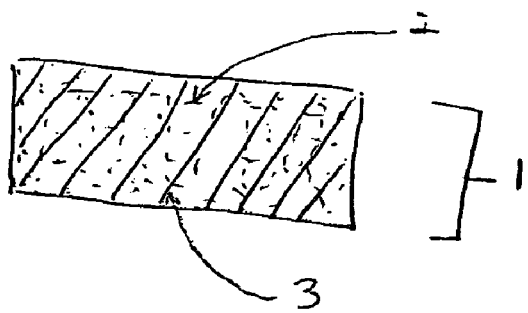
FIG. 3: A third schematic cross section of just one exemplified embodiment of the paper substrate that is included in the paper substrate of the present invention.

FIGS. 1-3 demonstrate different embodiments of the paper substrate 1 in the paper substrate of the present invention. FIG. 1 demonstrates a paper substrate 1 that has a web of cellulose fibers 3 and a sizing composition 2 where the sizing composition 2 has minimal interpenetration of the web of cellulose fibers 3. Such an embodiment may be made, for example, when a sizing composition is coated onto a web of cellulose fibers.

FIG. 2 demonstrates a paper substrate 1 that has a web of cellulose fibers 3 and a sizing composition 2 where the sizing composition 2 interpenetrates the web of cellulose fibers 3. The interpenetration layer 4 of the paper substrate 1 defines a region in which at least the sizing solution penetrates into and is among the cellulose fibers. The interpenetration layer may be from 1 to 99% of the entire cross section of at least a portion of the paper substrate, including 1, 2, 5, 10, 15, 20, 25, 30, 35, 40, 45, 50, 55, 60, 65, 70, 75, 80, 85, 90, 95, and 99% of the paper substrate, including any and all ranges and subranges therein. Such an embodiment may be made, for example, when a sizing composition is added to the cellulose fibers prior to a coating method and may be combined with a subsequent coating method if required. Addition points may be at the size press, for example.

FIG. 3 demonstrates a paper substrate 1 that has a web of cellulose fibers 3 and a sizing solution 2 where the sizing composition 2 is approximately evenly distributed throughout the web of cellulose fibers 3. Such an embodiment may be made, for example, when a sizing composition is added to the cellulose fibers prior to a coating method and may be combined with a subsequent coating method if required. Exemplified addition points may be at the wet end of the paper making process, the thin stock, and the thick stock.

The paper substrate may be made by contacting any component of the sizing solution with the cellulose fibers consecutively and/or simultaneously. Still further, the contacting may occur at acceptable concentration levels that provide the paper substrate of the present invention to contain any of the above-mentioned amounts of cellulose and components of the sizing solution. The contacting may occur anytime in the papermaking process including, but not limited to the thick stock, thin stock, head box, and coater with the preferred addition point being at the thin stock. Further addition points include machine chest, stuff box, and suction of the fan pump. Preferably, the components of the sizing solution are preformulated either together and/or in combination within a single and/or separate coating layer(s) and coated onto the fibrous web via a size press and/or coater.

The paper or paperboard of this invention can be prepared using known conventional techniques. Methods and apparatuses for forming and making and applying a coating formulation to a paper substrate are well known in the paper and paperboard art. See for example, G. A. Smook referenced above and references cited therein all of which is hereby incorporated by reference. All such known methods can be used in the practice of this invention and will not be described in detail.

The paper substrate may contain the sizing composition at any amount. The paper substrate may contain the sizing composition at an amount ranging from 70 to 300 lbs/ton of paper, preferably from 80 to 250 lbs/ton of paper, more preferably from 100 to 200 lbs/ton of paper, most preferably from 125 to 175 lbs/ton of paper. This range includes, 70, 80, 90, 100, 110, 120, 130, 140, 150, 160, 170, 180, 190, 200, 210, 220, 230, 240, 250, 260, 270 280, 290, and 300 lbs/ton of paper, including any and all ranges and subranges therein. In a preferred embodiment the paper substrate contains a size press applied sizing composition at an amount of 150 lbs/ton of paper substrate.

Given the above mentioned preferred amounts of sizing composition contained in the substrate of the present invention, combined with the above-mentioned amounts of pigment, binder, nitrogen containing compound, and inorganic salt; the amounts of each of the pigment, binder, nitrogen containing compound, inorganic salt that are contained in the paper may be easily calculated. For example, if 50 wt % of pigment is present in the sizing solution based upon the total weight of solids in the composition, and the paper substrate contains 150 lbs of the sizing composition/ton, then the paper substrate contains 50%×150lbs/ton of paper=75 lbs pigment/ton of paper, which is 75 lbs/2000 lbs×100=3.75 wt % pigment based upon the total weight of the paper substrate.

The paper substrate contains any amount of at least one pigment. The paper substrate may contain from 0.5 wt % to 10 wt %, preferably from 1 to 8 wt %, more preferably from 1.5 to 6 wt %, most preferably from 2 to 5 wt % of pigment based upon the total weight of the substrate. This range includes 0.5, 1, 1.5, 2, 2.5, 3, 3.5, 4, 4.5, 5, 5.5, 6, 6.5, 7, 7.5, 8, 8.5, 9, 9.5 and 10 wt % of pigment based upon the total weight of the substrate, including any and all ranges and subranges therein.

The paper substrate contains any amount of at least one binder. The paper substrate may contain from 0.1 wt % to 7 wt %, preferably from 0.2 to 5 wt %, more preferably from 0.3 to 3 wt %, most preferably from 1 to 3 wt % of binder based upon the total weight of the substrate. This range includes 0. 1, 0.2, 0.3, 0.4, 0.5, 1, 1.5, 2, 2.5, 3, 3.5, 4, 4.5, 5, 5.5, 6, 6.5, 7, and 7.5 wt % of binder based upon the total weight of the substrate, including any and all ranges and subranges therein.

The paper substrate contains any amount of at least one nitrogen containing compound. The paper substrate may contain from 0.01 wt % to 5 wt %, preferably from 0.05 to 2wt %, more preferably from 0.1 to 1.5 wt %, most preferably from 0.25 to 1 wt % of nitrogen containing compound based upon the total weight of the substrate. This range includes 0.01, 0.02, 0.03, 0.05, 0.07, 0.1, 0.2, 0.3, 0.4, 0.5, 0.6, 0.7, 0.8, 0.9, 1, 1.2, 1.4, 1.6, 1.8, 2.0, 2.2, 2.4, 2.6, 2.8, and 3 wt % of nitrogen containing compound based upon the total weight of the substrate, including any and all ranges and subranges therein.

The paper substrate contains any amount of at least inorganic salt. The paper substrate may contain from 0.001 wt % to 3 wt %, preferably from 0.01 wt % to 2.5 wt %, more preferably from 0.02 to 1 wt %, most preferably from 0.05 to 0.5 wt % of inorganic salt based upon the total weight of the substrate. This range includes 0.001, 0.002, 0.005, 0.007, 0.01, 0.02, 0.03, 0.05, 0.06, 0.07, 0.08, 0.09, 0.1, 0.2, 0.3, 0.4, 0.5, 0.6, 0.7, 0.8, 0.9, 1, 1.2, 1.4, 1.6, 1.8, 2.0, 2.2, 2.4, 2.6, 2.8, and 3 wt % of inorganic salt based upon the total weight of the substrate, including any and all ranges and subranges therein.

The paper substrate may contain any amount of OBA. The OBA may be cationic and/or anionic. The OBA may be supplied by the sizing composition as mentioned above and/or within the substrate itself. For example, the OBA may be premixed with the fibers at the wet end of the papermaking and even before the headbox. Preferred examples of using OBA:fiber mixes is found in U.S. Patent Applications having Application No. 60/654,712 filed Feb. 19, 2005; Ser. No. 11/358,543 filed Feb. 21, 2006; Ser. No. 11/445,809 filed Jun. 2, 2006; and Ser. No. 11/446,421 filed Jun. 2, 2006, which are hereby incorporated, in their entirety, herein by reference.

In one embodiment of the present invention, the paper substrate contains internal OBA and externally applied OBA. The internal OBA may be cationic or anionic, but is preferably anionic. The externally applied OBA may be cationic or anionic, but is preferably cationic. The externally applied OBA is preferably applied as a member of the sizing composition at the size press as mentioned above in the above preferred amounts of OBA. However, external OBA may also be applied at the coating section.

The paper substrate of the present invention may have any amount of OBA. In one embodiment, the OBA is present in as sufficient amount so that the paper has at least 80% GE brightness. The GE brightness is preferably at least 80, 85, 90, 91, 92, 93, 94, 95, 96, 97, 98, 99, and 100%, including any and all ranges and subranges contained therein.

Further, the paper may have a suitable amount of OBA and other additives (such as dyes) so that the paper preferably has a CIE whiteness of at least 130. The CIE whiteness may be at least 130, 135, 140, 145, 150, 155, 160, 65, 170, 175, 180, 185, 190, 195, and 200 CIE whiteness points, including any and all ranges and subranges therein.

In one embodiment, the substrate contains an effective amount of OBA. An effective amount of OBA is such that the GE brightness is at least 90, preferably at least 92, more preferably at least 94 and most preferably at least 95% brightness. The OBA may be a mixture of the above-mentioned internal and externally applied OBA, whether cationic and/or anionic so long as it is an effective amount.

The density, basis weight and caliper of the web of this invention may vary widely and conventional basis weights, densities and calipers may be employed depending on the paper-based product formed from the web. Paper or paperboard of invention preferably have a final caliper, after calendering of the paper, and any nipping or pressing such as may be associated with subsequent coating of from about 1 mils to about 35 mils although the caliper can be outside of this range if desired. More preferably the caliper is from about 4 mils to about 20 mils, and most preferably from about 7 mils to about 17 mils. The caliper of the paper substrate with or without any coating may be 1, 2, 3, 4, 5, 6, 7, 8, 9, 10, 11, 12, 13, 14, 15, 17, 20, 22, 25, 27, 30, 32, and 35, including any and all ranges and subranges therein.

Paper substrates of the invention preferably exhibit basis weights of from about 10 lb/3000 ft$^2$ to about 500 lb/3000 ft$^2$, although web basis weight can be outside of this range if desired. More preferably the basis weight is from about 30 lb/3000 ft$^2$ to about 200 lb/3000 ft$^2$, and most preferably from about 35 lb/3000 ft$^2$ to about 150 lb/3000 ft$^2$. The basis weight may be 10, 12, 15, 17, 20, 22, 25, 30, 32, 35, 37, 40, 45, 50, 55, 60, 65, 70, 75, 80, 85, 90, 95, 100, 110, 120, 130, 140, 150, 160, 170, 180, 190, 200, 225, 250, 275, 300, 325, 350, 375, 400, 425, 450, 500 lb/3000 ft$^2$, including any and all ranges and subranges therein.

The final density of the papers may be calculated by any of the above-mentioned basis weights divided by any of the above-mentioned calipers, including any and all ranges and subranges therein. Preferably, the final density of the papers, that is, the basis weight divided by the caliper, is preferably from about 6 lb/3000ft$^2$/mil to about 14 lb/3000 ft $^2$/mil although web densities can be outside of this range if desired. More preferably the web density is from about 7 lb/3000 ft$^2$/mil to about 13 lb/3000 ft$^2$/mil and most preferably from about 9 lb/3000 ft$^2$/mil to about 12 lb/3000 ft$^2$/mil.

The web may also include other conventional additives such as, for example, starch, expandable microspheres, mineral fillers, bulking agents, sizing agents, retention aids, and strengthening polymers. Among the fillers that may be used are organic and inorganic pigments such as, by way of example, polymeric particles such as polystyrene latexes and polymethylmethacrylate, and minerals such as calcium carbonate, kaolin, and talc. Other conventional additives include, but are not restricted to, wet strength resins, internal sizes, dry strength resins, alum, fillers, pigments and dyes. Internal sizing helps prevent the surface size from soaking into the sheet, thus allowing it to remain on the surface where it has maximum effectiveness. The internal sizing agents encompass any of those commonly used at the wet end of a paper machine. These include rosin sizes, ketene dimers and multimers, and alkenylsuccinic anhydrides. The internal sizes are generally used at levels of from about 0.00 wt. % to about 0.25 wt. % based on the weight of the dry paper sheet. Methods and materials utilized for internal sizing with rosin are discussed by E. Strazdins in The Sizing of Paper, Second Edition, edited by W. F. Reynolds, Tappi Press, 1989, pages 1-33. Suitable ketene dimers for internal sizing are disclosed in U.S. Pat. No. 4,279,794, which is incorporated by reference in its entirety, and in United Kingdom Patent Nos. 786, 543; 903,416; 1,373,788 and 1,533, 434, and in European Patent Application Publication No. 0666368 A3. Ketene dimers are commercially available, as Aquapel.RTM. and Precis.RTM. sizing agents from Hercules Incorporated, Wilmington, Del. Ketene multimers for use in internal sizes are described in: European Patent Application Publication No. 0629741A1, corresponding to U.S. patent application Ser. No. 08/254,813, filed Jun. 6, 1994; European Patent Application Publication No. 0666368A3, corresponding to U.S. patent application Ser. No. 08/192,570, filed Feb. 7, 1994; and U.S. patent application Ser. No. 08/601,113, filed Feb. 16, 1996. Alkenylsuccinic anhydrides for internal sizing are disclosed in U.S. Pat. No. 4,040,900, which in incorporated herein by reference in its entirety, and by C. E. Farley and R. B. Wasser in The Sizing of Paper, Second Edition, edited by W. F. Reynolds, Tappi Press, 1989, pages 51-62. A variety of alkenylsuccinic anhydrides are commercially available from Albemarle Corporation, Baton Rouge, La.

The paper substrate may be made by contacting further optional substances with the cellulose fibers as well. The contacting of the optional substances and the cellulose fibers may occur anytime in the papermaking process including, but not limited to the thick stock, thin stock, head box, size press, water box, and coater. Further addition points include machine chest, stuff box, and suction of the fan pump. The cellulose fibers, components of the sizing composition, and/or optional components may be contacted serially, consecutively, and/or simultaneously in any combination with each other. The cellulose fibers components of the sizing composition may be pre-mixed in any combination before addition to or during the paper-making process.

The paper substrate may be pressed in a press section containing one or more nips. However, any pressing means commonly known in the art of papermaking may be utilized. The nips may be, but is not limited to, single felted, double felted, roll, and extended nip in the presses. However, any nip commonly known in the art of papermaking may be utilized.

The paper substrate may be dried in a drying section. Any drying means commonly known in the art of papermaking may be utilized. The drying section may include and contain a drying can, cylinder drying, Condebelt drying, IR, or other drying means and mechanisms known in the art. The paper substrate may be dried so as to contain any selected amount of water. Preferably, the substrate is dried to contain less than or equal to 10% water.

The paper substrate may be passed through a size press, where any sizing means commonly known in the art of papermaking is acceptable. The size press, for example, may be a puddle mode size press (e.g. inclined, vertical, horizontal) or metered size press (e.g. blade metered, rod metered). At the size press, sizing agents such as binders may be contacted with the substrate. Optionally these same sizing agents may be added at the wet end of the papermaking process as needed. After sizing, the paper substrate may or may not be dried again according to the above-mentioned exemplified means and other commonly known drying means in the art of papermaking. The paper substrate may be dried so as to contain any selected amount of water. Preferably, the substrate is dried to contain less than or equal to 10% water. Preferably, the sizing apparatus is a puddle size press.

The paper substrate may be calendered by any commonly known calendaring means in the art of papermaking. More specifically, one could utilize, for example, wet stack calendering, dry stack calendering, steel nip calendaring, hot soft calendaring or extended nip calendering, etc. While not wishing to be bound by theory, it is thought that the presence of the expandable microspheres and/or composition and/or particle of the present invention may reduce and alleviate requirements for harsh calendaring means and environments for certain paper substrates, dependent on the intended use thereof.

The paper substrate may be microfinished according to any microfinishing means commonly known in the art of papermaking. Microfinishing is a means involving frictional processes to finish surfaces of the paper substrate. The paper substrate may be microfinished with or without a calendering means applied thereto consecutively and/or simultaneously. Examples of microfinishing means can be found in U.S. Published Patent Application 20040123966 and references cited therein, as well as U.S. Ser. No. 60/810181 filed on Jun. 2, 2006, which are all hereby, in their entirety, herein incorporated by reference.

The Hercules Sizing Test Value ("HST") of the substrate is selected to provide the desired waterfastness characteristics. The HST is measured using the procedure of TAPPI 530 pm-89. The paper substrate of the present invention may have any HST. In some embodiments, the HST may be as much as 400, 300, 200, and 100 seconds. Further, the HST may be is as low as 0.1, 1, 5 and 10 seconds. However, in a preferred embodiment of this invention, the HST is less than 10 seconds, preferably, less than 5 seconds, more preferably less than 3 seconds HST, most preferably less than about 1 second. The HST may be 0.001, 0.01, 0.05, 0.1, 0.5, 1, 1.5, 2, 2.5, 3, 3.5, 4, 4.5, 5, 5.5, 6, 6.5, 7, 7.5, 8, 8.5, 9, 9.5 and 10 seconds, including any and all ranges and subranges therein. As it is well known to those of ordinary skill in the art, the HST will vary directly with the basic weight of the substrate and other factors known to those of ordinary skill in the art. Based upon the foregoing information, one of ordinary skill in the art can use conventional techniques and procedures to calculate, determine and/or estimate a particular HST for the substrate used to provide the desired image waterfastness characteristics.

The paper substrate of the present invention may have any black optical density as measured by TAPPI METHOD T 1213 sp-03. The black optical density may be from 0.5 to 2.0, more preferably from 1.0 to 1.5. The black optical density may be 0.5, 0.6, 0.7, 0.8, 0.9, 1.0, 1.05, 1.06, 1.07, 1.08, 1.09, 1.10, 1.11, 1.12, 1.13, 1.14, 1.15, 1.16, 1.17, 1.18, 1.19, 1.2, 1.3, 1.4, and 1.5, including any and all ranges and subranges therein.

From density, one can naturally calculate waterfastness using the following equation:

(OD of soaked ink area/OD of unsoaked ink area) *100=% Waterfastness.

The paper substrate of the present invention may have any waterfastness. The paper substrate may have a waterfastness of at least 90%, preferably at least 95%, more preferably greater than 98%, most preferably greater than 100%, including any and all ranges and subranges therein.

In one embodiment of the present invention, the paper substrate may contain an effective amount of pigment and binder. An effective amount of pigment and binder is that which bestows on the paper a black optical density that is at least 1.0, preferably from 1 to 2, more preferably from 1 to 1.5 and most preferably from 1.1 to 1.3, including any and all ranges and subranges therein.

The present invention relates to a method of decreasing the HST of a paper substrate. Preferably, the above-mentioned sizing composition is contacted with a substrate having a first HST and containing a web of cellulose fibers and optional substances mentioned above at a size press or coating section so as to prepare a paper substrate having a second HST that is less than the first HST and containing the sizing composition, the web of cellulose fibers, and optional substance. While the second HST is less than the first HST, the present invention preferably reduces the first HST by at least 10%, more preferably by at least 25%, most preferably by at least 50%. This reduction range may be at least 10, 15, 20, 25, 30, 35, 40, 45, 50, 60, 75, 80, 95 and 99% of the first HST, including any and all ranges and subranges therein.

The present invention is explained in more detail with the aid of the following embodiment example which is not intended to limit the scope of the present invention in any manner.

EXAMPLES

Example 1

The following size press formulations were prepared for treating the un-surface sized base paper.

TABLE 1

| Chemicals | 1 | 2 | 3 | 4 | 5 | 6 | 7 |
|---|---|---|---|---|---|---|---|
| Jetcoat MD1093 Precipitated calcium carbonate | 100 | 100 | 100 | | | | |
| XC3310-1, ground calcium carbonate | | | | 100 | | | 100 |

TABLE 1-continued

| Chemicals | 1 | 2 | 3 | 4 | 5 | 6 | 7 |
|---|---|---|---|---|---|---|---|
| TX-75NX, silica treated calcium carbonate | | | | | 100 | | |
| TX-75ZX silica treated calcium carbonate | | | | | | 100 | |
| Polyvinyl alcohol | 20 | 10 | 10 | 10 | | | 10 |
| Oxidized starch | | 30 | 60 | 60 | 100 | | |
| Cationic starch | | | | | | 100 | 60 |
| Polydadmac | 10 | 10 | 10 | 10 | | | 10 |
| Calcium chloride | 5 | 5 | 5 | 5 | | | 5 |
| % solids | 13 | 13 | 13 | 13 | 13 | 13 | 13 |
| PH | 6.7 | 7.0 | 7.3 | 7 | 6.9 | 6.8 | 6.9 |
| Brookfiled viscosity | 27 | 46 | 80 | 55 | 118 | 38 | 27 |
| Temperarure, F. | 117 | 120 | 117 | 130 | 130 | 130 | 130 |

The pigmented size press formulations were applied to an unsurface sized 90 gsm base paper using a rod metering size press. The target coat weight or pick up is 6 gsm. Calendering was done on a steel-to-steel lab calender at room temperature with a nip pressure of 90 psi. The smoothness target is 125 Sheffield smoothness.

The paper samples from example 1 were evaluated for print performance on an Kodak Versamark 5000 digital press. Excellent print quality were obtained. The print density test results on the trial samples provided in example 1 are listed in the following table.

TABLE 2

| Condition | Print density on Kodak Versamark 5000 |
|---|---|
| 1 | 1.15 |
| 2 | 1.12 |
| 3 | 1.13 |
| 4 | 1.09 |
| 5 | 1.11 |
| 6 | 1.18 |
| 7 | 1.14 |

Example 2

Paper substrates having a basis weight of 24 lb/1300 square feet were made and a sizing composition was applied thereto both surfaces of the paper substrate at size press. The sizing compositions applied to the paper substrate are those according to the following Table 2.

TABLE 2

| functionality | Chem\Prop'ties\Cond'ns | 1 | 2 | 3 | 4 | 5 |
|---|---|---|---|---|---|---|
| | SP configuration | puddle | puddle | Puddle | puddle | puddle |
| pigment (2) | SMI JetCoat® 30 | 100 | | | | |
| | SMI MD 1093 | | 100 | 100 | 100 | 100 |
| Binder (2) | Clinton 442 starch | 60 | 60 | 60 | 60 | 60 |
| | Mowiol 28–99 | 10 | 10 | 10 | 10 | 10 |
| fixative (2) | Gen Floc F71100 | 10 | | | | |
| | Cartafix VXZ | | 10 | 10 | 15 | 15 |
| salt (2) | NaCl | 8 | 8 | 8 | 8 | 8 |
| | CaCl2 | | | | | 5 |
| brightener (2) | Leucophore BCW (wet pts) | 100 | | | | |
| | Leucophore FTS (wet pts) | | 20 | 20 | 20 | 20 |
| Wet-xer (1) | Amres 24HP | | 5 | | | 5 |
| properties | target % solids | 15 | 15 | 15 | 15 | 15 |
| | actual % solids | 15.2 | 15.1 | 15.1 | 15.1 | 15.3 |
| | Brookfield #2 @ 50 rpm | 122 | 160 | 89 | 76 | 61 |
| | Brookfield #2 @ 100 rpm | 100 | 125 | 84 | 70 | 69 |
| | pH | 8.0 | 7.3 | 7.8 | 7.8 | 7.0 |
| | temperature | 109 | 112 | 147 | 140 | 143 |
| | Pickup (lbs/3,300 ft2) | 4.8 | 4.6 | 4.6 | 5.0 | 4.9 |
| | pickup (gsm) | 7.1 | 6.8 | 6.8 | 7.4 | 7.25 |
| | pickup (lbs/ton of paper) | 157 | 151 | 151 | 164 | 161 |
| | $OD_{ori[a]}$ | 1.15/1.14 | 1.13/1.14 | 1.23/1.19 | 1.22/1.17 | 1.20/1.17 |
| | $OD_{soak\ \&\ dry[a]}$ | 1.13/1.19 | 1.14/1.19 | 1.22/1.19 | 1.22/1.17 | 1.19/1.17 |
| | $OD_{bleed[a]}$ | 0.26/0.33 | 0.44/0.48 | 0.13/0.11 | 0.04/0.12 | 0.08/0.18 |
| | % $Bleed_{[a]}$ | 22.83/29.13 | 39.26/42.00 | 10.35/8.85 | 2.76/10.41 | 6.42/15.47 |
| | % $H_2Ofastness_{[a]}$ | 97.78/104.08 | 100.98/105.05 | 99.60/100.42 | 100.14/100.15 | 99.31/100.15 |

Gen Floc F71100 (General Chemicals) and Cartafix VXZ (Clariant) are both of the chemical nature of poly(dadmac) and are nitrogen-containing species.

Amres, a kymene wet-strength resin from Kamira is also nitrogen-containing species.

Mowiol 28-99 (Clariant) is a version of PVOH, which is 99% hydrolyzed and is of high molecular weight.

Starch and PVOH were cooked separately and diluted to a solids level of about 15%. Each of the formulation was prepared in accordance with the recipe as tabulated above and was thoroughly mixed together.

An overall % solids was first arrived at greater than the targeted 15%, because the rest of the ingredients all have a solids level above 15%.

For each of the formulations, the actual initial % solids was measured and then diluted, as close as possible, to 15%. Each of the formulations was sent to the 14" pilot size press, which was pre-configured to C2S puddle operation.

The paper after size press was dried to 4.2 to 5.0% moisture.

The subscript [a] denotes average, which means each of the numbers was averaged from 4 or even more readings.

The two numbers before and after the slash sign represent readings from the two sides of the paper, respectively.

Ink jet print densities are measured by means of optical densities with an X-rite densitometer. The density according to TAPPI METHOD T 1213 sp-03 is the optical -negative logarithm to base 10 of transmittance for transparent material or the reflectance for an opaque material and has the equation Optical Density=log101 1/R, where R=Reflectance. The following densitometer was used: X-Rite Densitometer, manufactured by X-Rite Inc. Density is a function of the percentage of light reflected. From this density procedure, one can easily measure Waterfastness and % bleed as well using the following equations:

Calculation for % Waterfastness:

(OD of soaked ink area/OD of unsoaked ink area) *100=% Waterfastness

Calculation for % Bleed:

[(OD near soaked ink area−OD of paper)/OD unsoaked ink area]*100=% Bleed.

Numerous modifications and variations on the present invention are possible in light of the above teachings. It is, therefore, to be understood that within the scope of the accompanying claims, the invention may be practiced otherwise than as specifically described herein.

As used throughout, ranges are used as a short hand for describing each and every value that is within the range, including all subranges therein.

All of the references, as well as their cited references, cited herein are hereby incorporated by reference with respect to relative portions related to the subject matter of the present invention and all of its embodiments

What is claimed is:

1. A sizing composition, comprising:
   at least one pigment;
   at least one polyvinyl alcohol binder and at least one starch binder at a starch/polyvinyl alcohol weight ratio of from 8/1 to 1/1;
   at least one nitrogen containing organic species;
   at least one inorganic salt; and 10 to 50 wt % of an optical brightening agent based on the total weight of the solids in the composition.

2. The sizing composition according to claim 1, wherein the total binder is present at an amount ranging from at least 20 wt %, based upon the total weight of the solids in of the composition.

3. The sizing composition according to claim 1, wherein the optical brightening agent is cationic.

4. The sizing composition according to claim 1, comprising:
  at least one pigment at an amount of at least 30 wt % based upon the total weight of the solids in of the composition
  at least one binder at an amount of at least 20 wt % based upon the total weight of the solids in of the composition;
  at least one nitrogen containing organic species at an amount ranging from 1 to 20 wt % based upon the total weight of the solids in of the composition; and
  at least one inorganic salt at an amount ranging from 5 wt % based upon the total weight of the solids in of the composition.

5. A paper substrate comprising the sizing composition according to claim 4.

6. The paper substate according to claim 5, wherein the substrate has a print density of at least 1.0 and an HST of not more than 10 seconds.

7. The paper substrate according to claim 6, wherein the substrate has a waterfastness of at least 95%.

8. The paper substrate according to claim 5, which comprises a web of cellulosic fibers, wherein the sizing composition is coated on the web.

9. The paper substrate according to claim 5, which comprises a web of cellulosic fibers and wherein the sizing composition interpenetrates the web.

10. A paper substrate, comprising the sizing composition according to claim 4 and having
a print density of at least 1.0;
an HST of not more than 10 seconds; and
a waterfastness of at least 95%.

11. A paper substrate, comprising the sizing composition according to claim 1.

12. The paper substate according to claim 11, wherein the substrate has a print density of at least 1.0 and an HST of not more than 10 seconds.

13. The paper substrate according to claim 12, wherein the substrate has a waterfastness of at least 95%.

14. A method of making a paper suitable for ink jet printing, comprising contacting a web of cellulosic fibers with the composition according to claim 1.

15. A method of making the composition according to claim 1, comprising simultaneously or consecutively contacting at least one pigment, at least one polyvinyl alcohol binder and at least one starch binder at a starch/polyvinyl alcohol weight ratio of from 8/1 to 1/1, at least one nitrogen containing organic species, at least one inorganic salt, and 10 to 50 wt % of an optical brightening agent based on the total weight of the solids in the composition.

16. A method of increasing the print density of a paper substrate, comprising contacting a web of cellulosic fibers with the composition according to claim 1 to form the substrate.

17. The sizing composition according to claim 1, comprising 20 to 40 wt % of the optical brightening agent based on the total weight of the solids in the composition.

18. The sizing composition according to claim 1, wherein the optical brightening agent is anionic.

19. The sizing composition according to claim 1, wherein the inorganic salt is present in an amount of 0.25 to 25 wt % based on the total weight of the solids in the composition.

20. The sizing composition according to claim 1, wherein the nitrogen containing organic species is present in an amount of 0.5 to 50 wt % based on the total weight of the solids in the composition.

* * * * *